US008824862B2

(12) United States Patent
Sasaki et al.

(10) Patent No.: US 8,824,862 B2
(45) Date of Patent: Sep. 2, 2014

(54) INFORMATION PROCESSING APPARATUS, INFORMATION PROCESSING METHOD, AND PROGRAM

(75) Inventors: Masachika Sasaki, Kanagawa (JP); Kenji Shoda, Kanagawa (JP); Takahiro Shimada, Saitama (JP); Kunihiro Iwakiri, Tokyo (JP)

(73) Assignee: Sony Corporation (JP)

( * ) Notice: Subject to any disclaimer, the term of this patent is extended or adjusted under 35 U.S.C. 154(b) by 105 days.

(21) Appl. No.: 13/207,558

(22) Filed: Aug. 11, 2011

(65) Prior Publication Data
US 2012/0045188 A1 Feb. 23, 2012

(30) Foreign Application Priority Data

Aug. 19, 2010 (JP) ................. P2010-184166

(51) Int. Cl.
*G11B 27/00* (2006.01)
*H04N 5/93* (2006.01)
*H04N 9/80* (2006.01)
*G06F 17/00* (2006.01)
*G09G 5/00* (2006.01)

(52) U.S. Cl.
USPC ........... 386/282; 386/280; 386/283; 386/239; 386/240; 386/241; 386/248; 345/418; 345/661; 345/625; 345/650; 345/655; 345/659

(58) Field of Classification Search
USPC ................. 345/418, 661, 625, 650, 655, 659; 386/280, 282, 283, 239, 240, 241, 248
See application file for complete search history.

(56) References Cited

U.S. PATENT DOCUMENTS

| | | | | |
|---|---|---|---|---|
| 6,466,237 B1 * | 10/2002 | Miyao et al. | ................... | 715/838 |
| 7,296,242 B2 | 11/2007 | Agata et al. | | |
| 8,281,244 B2 * | 10/2012 | Neuman et al. | ............... | 715/716 |
| 2007/0222768 A1 * | 9/2007 | Geurts et al. | ................... | 345/173 |
| 2008/0226198 A1 * | 9/2008 | Ebato et al. | ................... | 382/305 |
| 2010/0073126 A1 * | 3/2010 | Morin et al. | ................... | 340/5.2 |

FOREIGN PATENT DOCUMENTS

| | | |
|---|---|---|
| JP | 2000-105772 A | 4/2000 |
| JP | 2001-312350 A | 11/2001 |
| JP | 2008-228135 A | 9/2008 |

* cited by examiner

*Primary Examiner* — Daquan Zhao
(74) *Attorney, Agent, or Firm* — Lerner, David, Littenberg, Krumholz & Mentlik, LLP

(57) ABSTRACT

An information processing apparatus includes: a display unit including a screen; a detection unit configured to detect a position designated by a user on the screen; and a controller configured to display, with at least a partial range of a moving image being a display range, a plurality of images corresponding to a plurality of frames belonging to the display range by annularly arranging them in time series, and shift, when an operation is judged to be made along a direction in which the plurality of images are arranged based on a result of the detection by the detection unit, the display range in the moving image.

2 Claims, 13 Drawing Sheets

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-184166 filed in the Japanese Patent Office on Aug. 19, 2010, the entire content of which is incorporated herein by reference.

The present disclosure relates to an information processing apparatus capable of providing a GUI that uses a thumbnail image, an information processing method, and a program.

BACKGROUND

The present disclosure relates to an information processing apparatus capable of providing a GUI that uses a thumbnail image, an information processing method, and a program.

In recent years, due to improvements in quality and function of hardware constituting an information processing apparatus, it has become possible to perform operations of shooting, saving, and reproducing a high-resolution moving image also in a portable information processing apparatus such as a smart phone and a PDA (Personal Digital Assistant). As a method of using a moving image in the information processing apparatus as described above, there is a method of selecting a desired frame from a moving image and saving it as a still image.

The selection of a desired frame from a moving image is normally carried out by artificially searching the entire moving image by, for example, reproducing, fast-forwarding, rewinding, pausing, and skipping the moving image. In addition, it is also possible for a user to operate a slider with which a position on a time axis can be designated, to select a frame to be reproduced.

Moreover, in Japanese Patent Application Laid-open No. 2008-228135 (paragraphs 0047-0065, FIGS. 3 to 6; hereinafter, referred to as Patent Document 1), a plurality of thumbnail images as contracted images in a frame set every almost-constant interval in a moving image are displayed by being arranged longitudinally and laterally along a time axis, and when a desired thumbnail image is selected out of the thumbnail images by a user, reproduction of a moving image is started from a frame position corresponding to the thumbnail image. Also by this method, a still image of a desired frame can be selected efficiently. In Patent Document 1, forward/back keys (softkey) for moving a time range for which thumbnail images are to be displayed in a serial moving image (scene) are displayed on a display screen of the thumbnail images. By operating the forward/back keys, the user can display thumbnail images of a time range not displayed on the screen. It is also possible to change the time interval of thumbnail images to be displayed by operating a switch displayed on the screen.

SUMMARY

In the system that moves the display range of thumbnail images by an operation to keys such as the forward/back keys described above, the display range of thumbnail images that is moved with respect to a single operation to a key is normally limited based on the number of thumbnail images that can be displayed on the screen so that no thumbnail image is skipped. Therefore, for moving from a display range of a current thumbnail image to a relatively-apart display range, a touch operation on the same key may need to be repeated, which is troublesome.

Moreover, for repeating the forward/back operation of the display range of thumbnail images, a user may need to change an operation target between the forward key and the back key. Therefore, especially in a case where the forward key and the back key are provided apart from each other, a position of a key of a change destination may need to be changed every time a key to be operated is changed, which is a hamper in improving operational efficiency.

Furthermore, in Patent Document 1 above, when changing a time interval of thumbnail images to be displayed by an operation to a switch displayed on the screen, a plurality of operations including invoking a change operation screen by a different operation (press of option key) and setting the time interval using the change operation screen are made. This also becomes a hamper in improving operational efficiency.

Further, in Patent Document 1, the frame that displays thumbnail images are not necessarily images of a frame set every constant interval, but thumbnail images that are obtained by contracting in-frame compression-coded images closest to the frame set every constant interval. However, since the frame to be stored as a still image is not necessarily an in-frame compression-coded image, there may be a need to also display a thumbnail image of an inter-frame differential compression image when cutting out the still image. However, since the inter-frame differential compression image is decoded by first decoding a relevant in-frame compression-coded image, a standby time before the thumbnail image is displayed becomes relatively long, which also becomes a hamper in improving operational efficiency.

In view of the circumstances as described above, there is a need for an information processing apparatus, information processing method, and program with which excellent GUI operability using an image can be obtained.

According to an embodiment of the present disclosure, there is provided an information processing apparatus including: a display unit including a screen; a detection unit configured to detect a position designated by a user on the screen; and a controller configured to display, with at least a partial range of a moving image being a display range, a plurality of images corresponding to a plurality of frames belonging to the display range by annularly arranging them in time series, and shift, when an operation is judged to be made along a direction in which the plurality of images are arranged based on a result of the detection by the detection unit, the display range in the moving image.

In the present disclosure, by the user performing an operation along the direction in which the plurality of images are arranged, the controller shifts the display range at least as the partial range of the moving image in which the plurality of images are annularly arranged and displayed in time series in a time axis direction. As a result, user operability in shifting the display range is improved. Further, by the user touching the screen like drawing a circle, for example, an improvement in operational efficiency as in consecutively shifting the thumbnail display range at set frame intervals can be expected.

The plurality of images annularly arranged and displayed on the screen may be a plurality of images each corresponding to a frame set for each of set intervals.

The controller may display an operation object for receiving an operation input from the user at substantially the center of the annularly-arranged images, and set, when an operation is judged to be made to the operation object based on a result of the detection by the detection unit, a setting value of the intervals. With this structure, by changing the setting value of the intervals by operating the operation object, the length of the display range can be changed. In addition, since the operation object is displayed at substantially the center of the annularly-arranged images, the operation object can be operated while the user is simultaneously looking at the images and the operation object, with the result that an improvement in operability can be expected.

The controller may display an operation object for receiving an operation input from the user at substantially the center of the annularly-arranged images, and shift the display range when an operation is judged to be made to the operation object based on a result of the detection by the detection unit. With this structure, the display range can be shifted also by operating the operation object.

The controller may discriminate an operation content with respect to the operation object at least between a first operation content and a second operation content, set the setting value of the intervals when judged as the first operation content, and shift the display range when judged as the second operation content. With this structure, the shift of the display range and the change of the setting value of the intervals can be performed by operating a single operation object, with the result that an improvement in operability can be expected.

Here, the first operation content is an operation for moving the operation object in a first axial direction on the screen, and the second operation content is an operation for moving the operation object in a second axial direction orthogonal to the first axial direction. With this structure, by selecting the axial direction in which the operation object is to be moved, the shift of the display range and the change of the setting value of the intervals can be switched, thus leading to an improvement in operability.

The controller may display a gauge area including a gauge that indicates a position and occupant ratio of the display range in the moving image, and a displacement direction of the gauge may coincide with the second axial direction in the gauge area. With this structure, the position and occupant ratio of the display range in the moving image can be recognized by the user based on a display status (position and length) of the gauge in the gauge area, thus leading to an improvement in operability.

The moving image may be data encoded based on an inter-frame prediction, and the controller may display the image by decoding an encoded frame, and display, when the decode of a display target frame to be displayed as the image depends on a decoding result of other adjacent frames, a thumbnail image as the decoding result of the other frames until the decoding result of the display target frame is obtained since obtaining the decoding result of the other frames. With this structure, the standby time before an image is first displayed is shortened, and the fear that the user may feel a stress by the long standby time before the image is displayed is alleviated.

According to another embodiment of the present disclosure, there is provided an information processing method including: displaying, by a controller, with at least a partial range of a moving image being a display range, a plurality of images corresponding to a plurality of frames belonging to the display range by annularly arranging them in time series; and shifting, by the controller, when an operation is judged to be made along a direction in which the plurality of images are arranged based on a result of the detection by a detection unit that detects a position designated by a user on a screen, the display range in the moving image.

According to another embodiment of the present disclosure, there is provided a program causing a computer in an information processing apparatus including a display unit including a screen and a detection unit that detects a position designated by a user on the screen to operate to display, with at least a partial range of a moving image being a display range, a plurality of images corresponding to a plurality of frames belonging to the display range by annularly arranging them in time series, and shift, when an operation is judged to be made along a direction in which the plurality of images are arranged based on a result of the detection by the detection unit, the display range in the moving image.

As described above, according to the embodiments of the present disclosure, it is possible to improve operability with respect to a GUI using an image.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.
<First Embodiment>
This embodiment relates to an information processing apparatus including a frame selection GUI for prompting a user to select an image of a frame to be stored as a still image in a moving image. An example of a product form of the information processing apparatus of this embodiment is a portable terminal such as a smart phone and a PDA (Personal Digital Assistant). The information processing apparatus of the present disclosure is of course not limited to such a product form.

Figure 1:
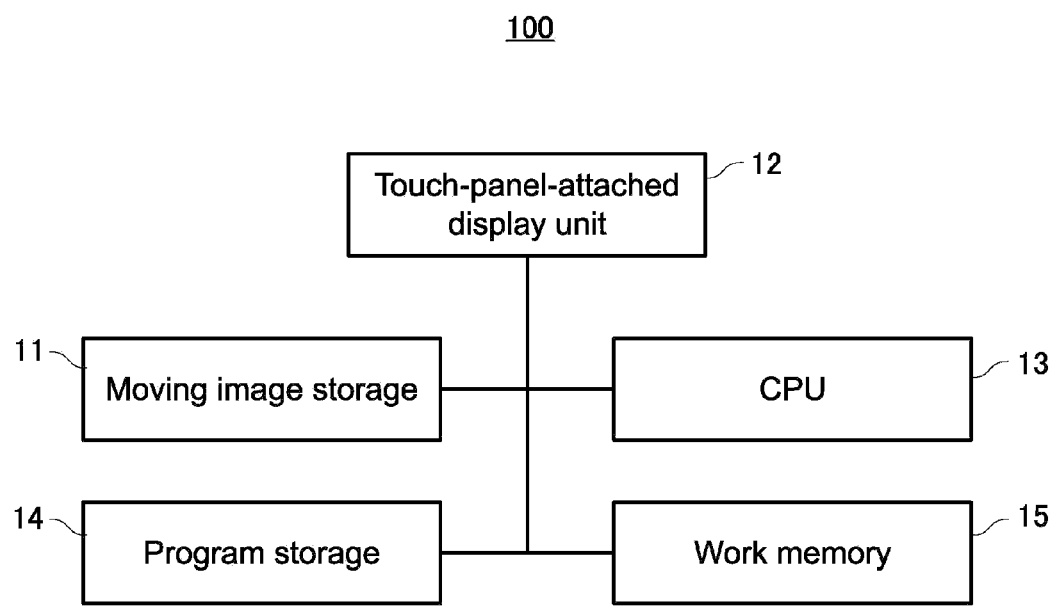
FIG. 1 is a block diagram showing a hardware structure of an information processing apparatus according to a first embodiment.

FIG. 1 is a block diagram showing a hardware structure of the information processing apparatus according to the first embodiment.

As shown in FIG. 1, the information processing apparatus 100 is constituted of a moving image storage 11, a touch-panel-attached display unit 12 (detection unit and display unit), a CPU (Central Processing Unit) 13 (controller), a program storage 14, a work memory 15, and the like.

The moving image storage 11 stores moving image data compression-coded by, for example, an inter-frame prediction. More specifically, the moving image storage 11 is a rewritable storage apparatus having a large capacity, such as a memory card, an SSD (Solid State Drive), and an HDD (Hard Disk Drive).

The touch-panel-attached display unit 12 is constituted of, for example, a display panel and a touch panel provided above the display panel. As the display panel, a panel-type display such as a liquid crystal display and an organic EL (Electro-Luminescence) display is used. As the touch panel, a capacitance-type touch panel, a resistive-film-type touch panel, or the like is used. The touch panel processes an operation input from a user with respect to a GUI (Graphical User Interface) displayed on the display panel. Specifically, the touch panel consecutively detects a position that a finger of the user has touched or come close to with respect to a GUI screen and supplies a line of the positional information to the CPU 13.

The CPU 13 controls the entire information processing apparatus 100. For example, the CPU 13 is capable of performing the following processing according to a program stored in the program storage 14.

1. Processing of generating a thumbnail image by decoding moving image data, and displaying a GUI such as a frame selection screen including a plurality of thumbnail images 2. Processing of judging an operation input from a user with respect to a GUI such as a frame selection screen based on information from the touch panel 3. Processing of shifting a range of a plurality of thumbnail images in a moving image (thumbnail display range) that are to be displayed on the frame selection screen, in accordance with the judged operation input 4. Processing of changing a frame interval of a plurality of thumbnail images that are to be displayed on the frame selection screen, in accordance with the judged operation input 5. Processing of storing a still image of a frame corresponding to a thumbnail image selected by the user, in accordance with the judged operation input The work memory 15 is a memory that is used as a working space for the processing carried out by the CPU 13.

It should be noted that although FIG. 1 shows the structure in the case where the CPU 13 decodes moving image data, the decode of moving image data may be carried out by dedicated hardware (decoder).

(Structure of Frame Selection Screen)

Figure 2:
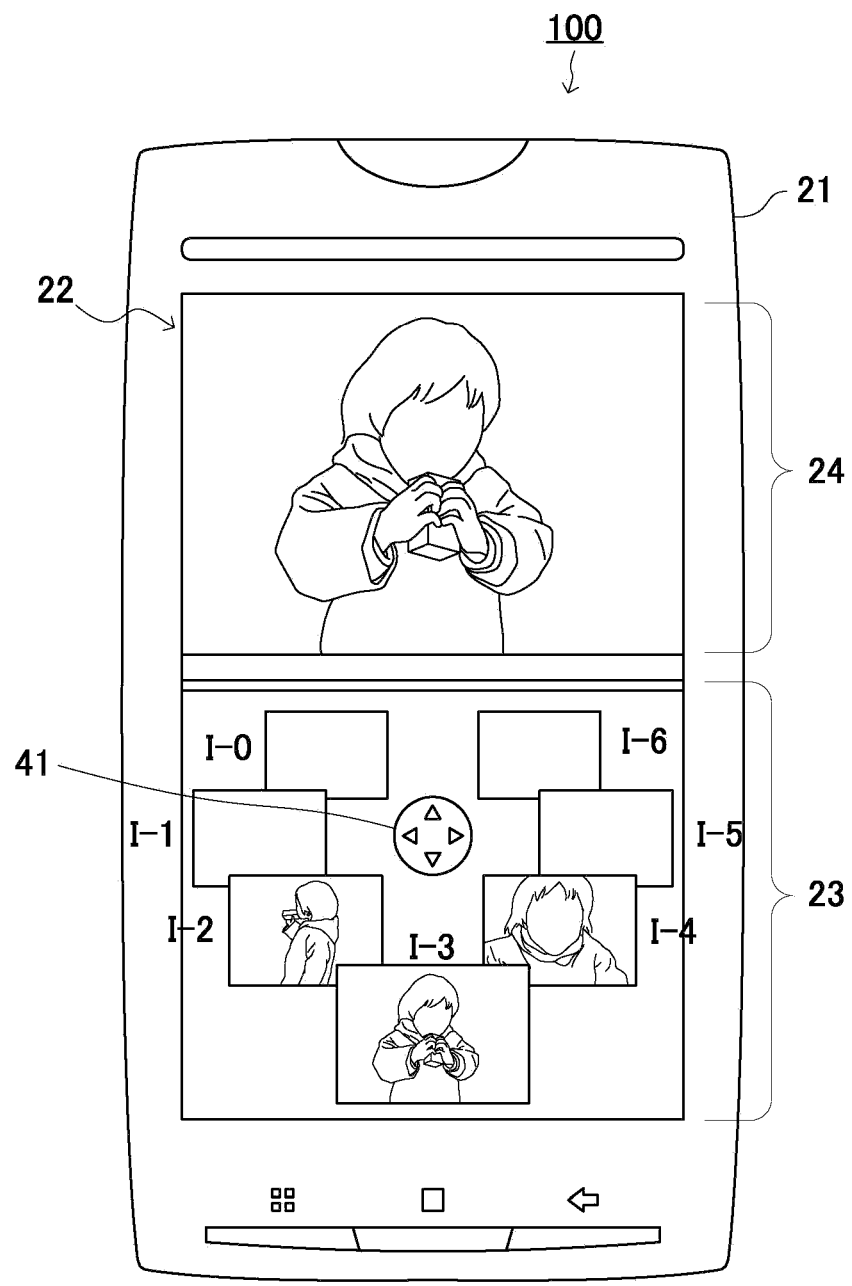
FIG. 2 is a front view including a frame selection screen of the information processing apparatus shown in FIG. 1.

FIG. 2 is a front view including the frame selection screen of the information processing apparatus 100 of this embodiment.

In the figure, 21 denotes a casing of the information processing apparatus 100, and the components shown in FIG. 1 are accommodated in the casing 21. 22 denotes a screen of the touch-panel-attached display unit 12. The touch panel is provided in correspondence with the screen 22.

The frame selection screen is a GUI screen for prompting the user to find and select an image of a frame to be stored as a still image in a moving image. The frame selection screen includes a thumbnail display area 23 provided on a lower side and a selection candidate frame display area 24 provided on an upper side.

In the thumbnail display area 23, a plurality of thumbnail images I-0, I-1, . . . , and I-6 respectively corresponding to a plurality of frames belonging to at least a partial time range of a moving image are displayed by being arranged annularly. In addition, at the center of the annularly-arranged thumbnail images I-0, I-1, . . . , and I-6, an operation object 41 used for a "shift operation of thumbnail display range" and a "setting frame interval change operation", that are to be described later, is displayed.

Figure 13:
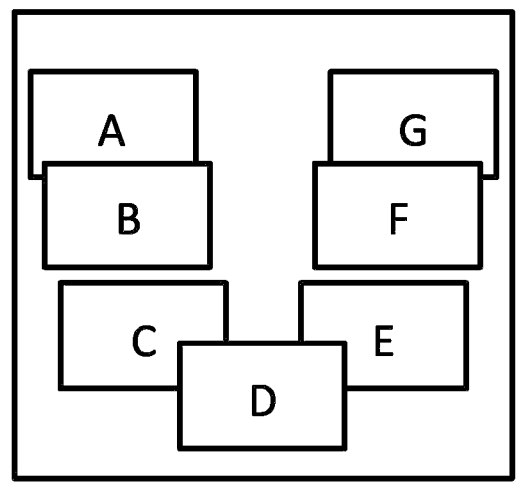
FIG. 13 is a diagram showing another arrangement of a plurality of thumbnail images.
Figure 14:
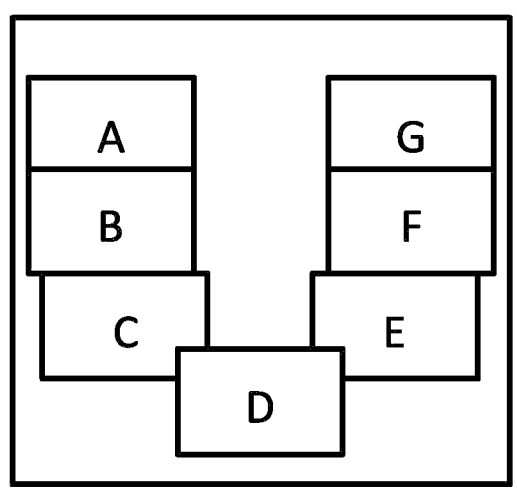
FIG. 14 is a diagram showing another arrangement of the plurality of thumbnail images.

It should be noted that the arrangement of a plurality of thumbnail images are not limited to the annular arrangement, and the images may be arranged in a V shape as shown in FIG. 13 or a U shape as shown in FIG. 14.

The number of thumbnail images displayed in the thumbnail display area 23 will hereinafter be referred to as "thumbnail display count". The thumbnail display count may either be fixed or variable, but is fixed in this embodiment. Each frame displayed as a thumbnail image is a frame belonging to a partial range of a moving image. The partial range is a range sectioned so as to include N frames. The partial range will hereinafter be referred to as "thumbnail display range". A plurality of frames displayed as thumbnail images are frames set every constant interval in the thumbnail display range. The interval will hereinafter be referred to as "setting frame interval".

The thumbnail display range can be shifted along a time axis by the "shift operation of thumbnail display range" to be described later. Moreover, a length of the thumbnail display range (number of frames=N) can be changed by the "setting frame interval change operation" to be described later. The CPU 13 of the information processing apparatus 100 judges the "shift operation of thumbnail display range" and the "setting frame interval change operation" based on the position detected by the touch panel and performs control to shift the thumbnail display range or change the length of the thumbnail display range by changing the setting frame interval according to the program stored in the program storage 14. As described above, by shifting the thumbnail display range or changing the length of the thumbnail display range, the user can see across the entire moving image data in various time scales. As a result, the user can efficiently search for a frame of an instantaneous scene that he/she wishes to store as a still image and store a still image of the frame. It should be noted that the storage destination of still images is, for example, the moving image storage 11.

As shown in FIG. 2, in this embodiment, the thumbnail images I-0, I-1, . . . , and I-6 of a predetermined thumbnail display count (7 in this embodiment) are displayed by being annularly arranged on the frame selection screen. Here, the thumbnail image I-6 at an upper right-hand position is a thumbnail image corresponding to a frame on a most rearward side on the time axis among the 7 thumbnail images I-0, I-1, . . . , and I-6 belonging to the thumbnail display range. The thumbnail image I-0 on an upper left-hand position is a thumbnail image corresponding to a frame that is closest to a start point on the time axis among the 7 thumbnail images I-0, I-1, . . . , and I-6 belonging to the thumbnail display range. Further, the thumbnail image I-3 at a lowest position in the middle is a thumbnail image corresponding to an intermediate frame on the time axis among the 7 thumbnail images I-0, I-1, . . . , and I-6 belonging to the thumbnail display range. The image of the intermediate frame is simultaneously displayed in the selection candidate frame display area 24. The image displayed in the selection candidate frame display area 24 is an image that can be stored as a still image based on an operation input from the user.

As a method for the operation input of the user for storing a still image, there is a method in which the user touches the thumbnail image I-3 corresponding to the intermediate frame or the selection candidate frame display area 24 to display a store operation screen for storing an image of the frame as a still image.

Figure 3:
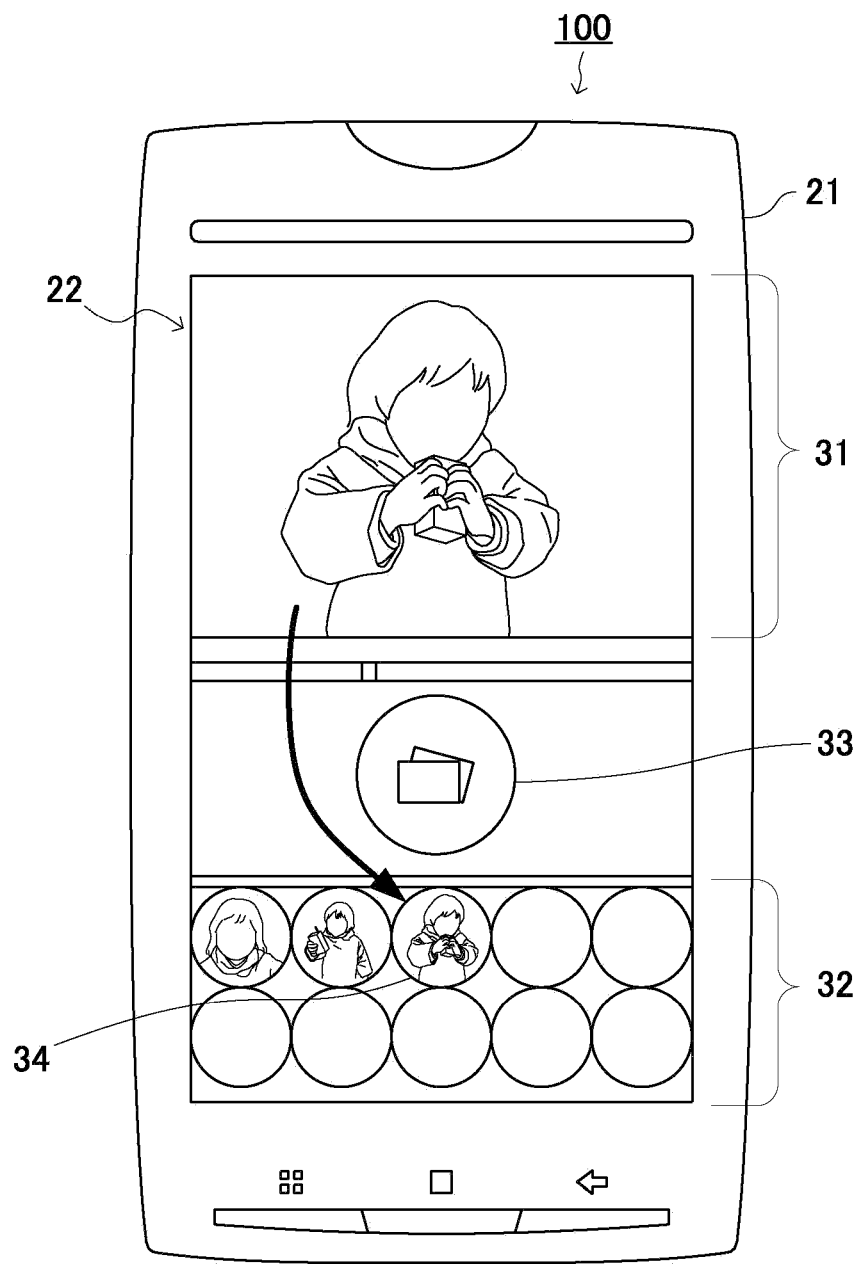
FIG. 3 is a diagram showing a store operation screen of a still image.

FIG. 3 shows an example of the store operation screen. Provided in the store operation screen are a store target image area 31 in which an image of a frame as a store target is displayed and a still image list area 32 in which a list of contracted images of stored still images is displayed. When the user makes an operation input (e.g., touch operation on store execution button 33) for storing to the store operation screen by a touch operation, the frame image is stored as a still image in, for example, the moving image storage 11, and a contracted image of the newly-stored still image is added to the still image list area 32. Moreover, when the user makes an operation input such as touching an arbitrary contracted image 34 in the still image list area 32, for example, the frame selection screen including the thumbnail display area 23 in which a thumbnail image corresponding to a frame of the contracted image 34 is set as the thumbnail image I-3 corresponding to the intermediate frame in the thumbnail display range is displayed. As a result, the user can return to the task of searching for a frame to be stored as a still image.

Further, as shown in FIG. 2, a laterally-long gauge area 25 is provided between the thumbnail display area 23 and the selection candidate frame display area 24. In the gauge area 25, a gauge 26 that indicates a position and occupant ratio of the thumbnail display range in the entire moving image is displayed while being displaceable in the lateral direction. The gauge 26 indicates a position of the thumbnail display range in the entire moving image with a position in the gauge area 25 and indicates a ratio of the thumbnail display range to the entire moving image with a size of a width in the lateral direction.

(Shift Operation of Thumbnail Display Range)

In the information processing apparatus 100 of this embodiment, the thumbnail display range can be shifted in both a forward direction and a back direction in time by an operation input on the touch panel in the thumbnail display area 23 of the frame selection screen shown in FIG. 2. As a specific operation method, there are the following operations, for examples.

Operation method 1: Operation of tracing along a plurality of annularly-arranged thumbnail images in a clockwise or counterclockwise direction Operation method 2: Operation of moving the operation object 41 displayed in the middle of the annularly-arranged thumbnail images in left- or right-hand direction First, the operation method 1 will be described.

Figure 4:
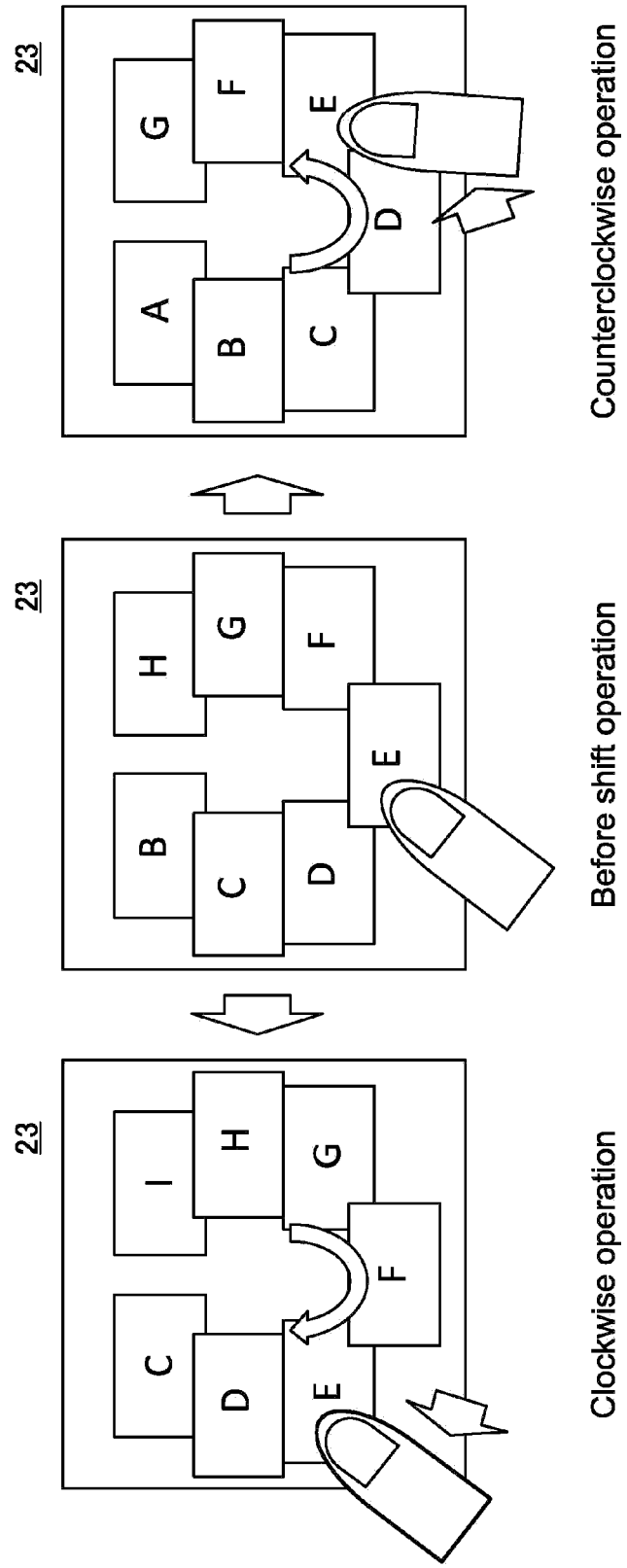
FIG. 4 is a diagram for explaining a shift operation of a thumbnail display range by an operation method 1 in the information processing apparatus shown in FIG. 1.

FIG. 4 is a diagram showing states of the thumbnail display area 23 before (center) and after (left- and right-hand sides) the shift operation of the thumbnail display range by the operation method 1 is made. An illustration of the operation object 41 is omitted. A to H are each a thumbnail image, and a direction from A to I is a direction of time. In this example, the thumbnail display count is fixed to "7".

Figure 6:
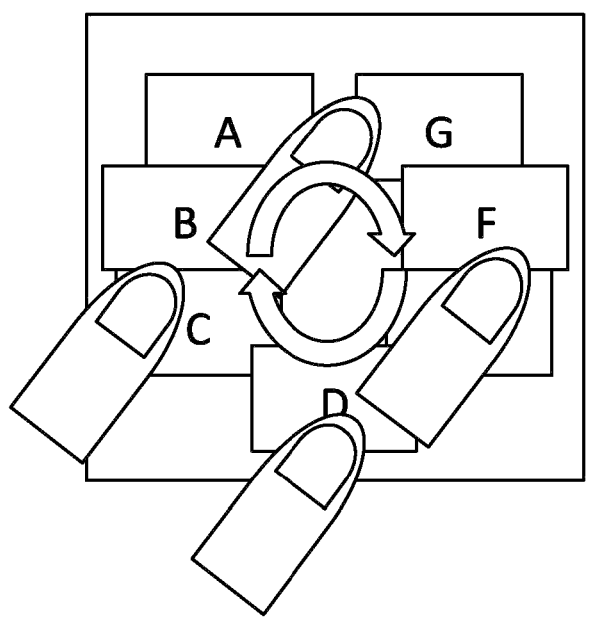
FIG. 6 is a diagram for explaining an application example of the operation method 1 shown in FIG. 4.

In the state before the shift operation of the thumbnail display range (center), the thumbnail images B to H are displayed. Here, when an operation of tracing the screen in the clockwise direction along the plurality of annularly-arranged thumbnail images as shown on the left-hand side of FIG. 6 is made by the user as in the left-hand side of FIG. 4, the CPU 13 judges the operation and shifts the thumbnail display range only by an amount corresponding to the setting frame interval in the time forward direction. As a result, the state where the thumbnail images B to H are displayed is updated to a state where thumbnail images C to I are displayed. Specifically, the thumbnail image B corresponding to a frame closest to the start point, that has been displayed before the shift operation of the thumbnail display range is made, disappears, the thumbnail images C to H shift one by one in the clockwise direction along the annular arrangement, and the thumbnail image I corresponding to a frame following the thumbnail image H by an amount corresponding to the setting frame interval newly appears. Furthermore, the CPU 13 shifts the position of the gauge 26 in the gauge area 25 only by a distance corresponding to the shift amount of the thumbnail display range in the right-hand direction.

Conversely, when an operation of tracing the screen in the counterclockwise direction is made along the plurality of annularly-arranged thumbnail images by the user as in the right-hand side of FIG. 4, the CPU 13 shifts the thumbnail display range only by an amount corresponding to the setting frame interval in the counterclockwise direction. As a result, the state where the thumbnail images B to H are displayed is updated to a state where the thumbnail images A to G are displayed. Specifically, the thumbnail image H corresponding to a frame closest to the end point, that has been displayed before the shift operation of the thumbnail display range is made, disappears, the thumbnail images B to G shift one by one in the counterclockwise direction along the annular arrangement, and the thumbnail image A corresponding to a frame preceding the thumbnail image B only by an amount corresponding to the setting frame interval newly appears. Furthermore, the CPU 13 shifts the position of the gauge 26 in the gauge area 25 only by a distance corresponding to the shift amount of the thumbnail display range in the left-hand direction.

Then, every time an operation of tracing the screen in the clockwise or counterclockwise direction along the plurality of annularly-arranged thumbnail images is judged, the CPU 13 shifts, as well as shift the thumbnail display range by an amount corresponding to the setting frame interval in the clockwise or counterclockwise direction, the position of the gauge 26 in the gauge area 25 in the right- or left-hand direction. Therefore, by repeating the operation in the same direction a plurality of times, the thumbnail display range is shifted by an amount obtained by multiplying the setting frame interval by the number of times the operation is repeated.

It should be noted that in the judgment on the operation of tracing the screen in the clockwise or counterclockwise direction along the plurality of annularly-arranged thumbnail images, specific conditions including which area of the thumbnail display range is to be traced by what length or rotational angle need to be set. The conditions need to be selected as appropriate.

Figure 5:
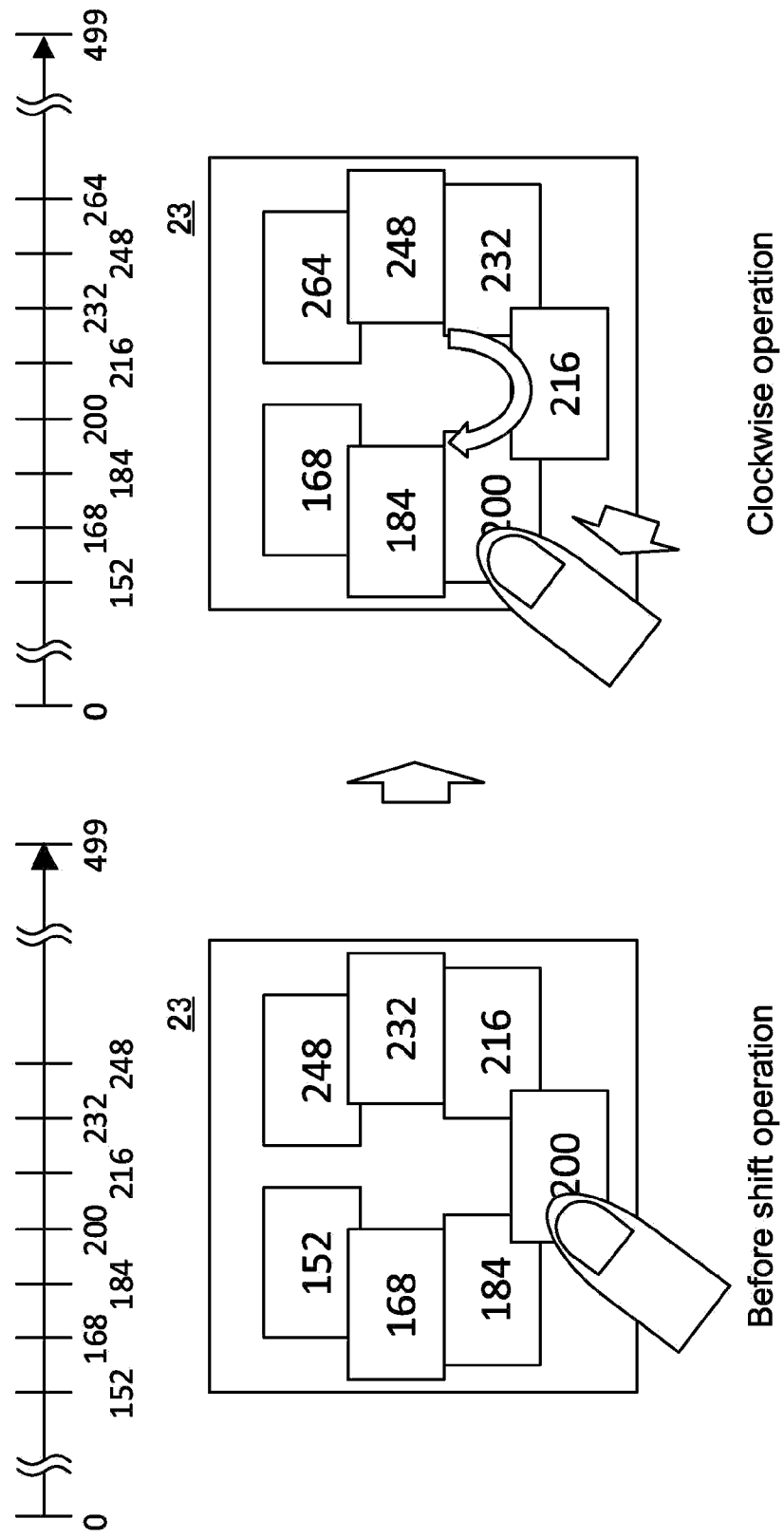
FIG. 5 is a diagram showing specific examples of the shift operation of the thumbnail display range by the operation method 1 shown in FIG. 4.

FIG. 5 is a diagram showing specific examples of the shift operation of the thumbnail display range by the operation method 1. The left-hand side of FIG. 5 shows a state before the shift operation is made, and the right-hand side of FIG. 5 shows a state after the shift operation in the clockwise direction is made.

In the state before the shift operation of the thumbnail display range is made (left-hand side), for example, thumbnail images corresponding to a total of 7 frames, that is, 3 frames in front and back of a 200-th frame as an intermediate frame of a moving image constituted of 500 frames, that are provided at a 16-frame interval, are displayed. From this state, assuming that the user has made an operation of tracing the screen in the clockwise direction along the plurality of annularly-arranged thumbnail images as shown on the right-hand side of FIG. 5, the CPU 13 judges the operation and shifts the thumbnail display range only by an amount corresponding to the setting frame interval (16 frames) in the clockwise direction. As a result, the thumbnail image corresponding to a frame closest to the start point in the thumbnail display range (frame number=152) disappears, thumbnail images corresponding to frames having frame numbers 168, 184, 200, 216, 232, and 248 shift one by one in the clockwise direction, and a thumbnail image corresponding to a frame closest to the end point in the shifted thumbnail display range (frame number=264) newly appears in the thumbnail display area 23. The CPU 13 also shifts the position of the gauge 26 in the gauge area 25 in the right-hand direction in correspondence with the shift of the thumbnail display range.

Further, the shift amount of the thumbnail display range may be controlled variably in accordance with the distance or rotational angle with which the screen is traced along the plurality of annularly-arranged thumbnail images.

Accordingly, by the user tracing the screen as if drawing a circle along the plurality of annularly-arranged thumbnail images as shown in FIG. 6, for example, the thumbnail display range can be consecutively shifted at the setting frame intervals.

Moreover, since the position of the gauge 26 in the gauge area 25 is also shifted along with the shift of the thumbnail display range, the user can grasp at a glance what thumbnail image of which frame at what position in a moving image is being displayed. As a result, an improvement in operability can be expected.

Next, the operation method 2 will be described.

Figure 7:
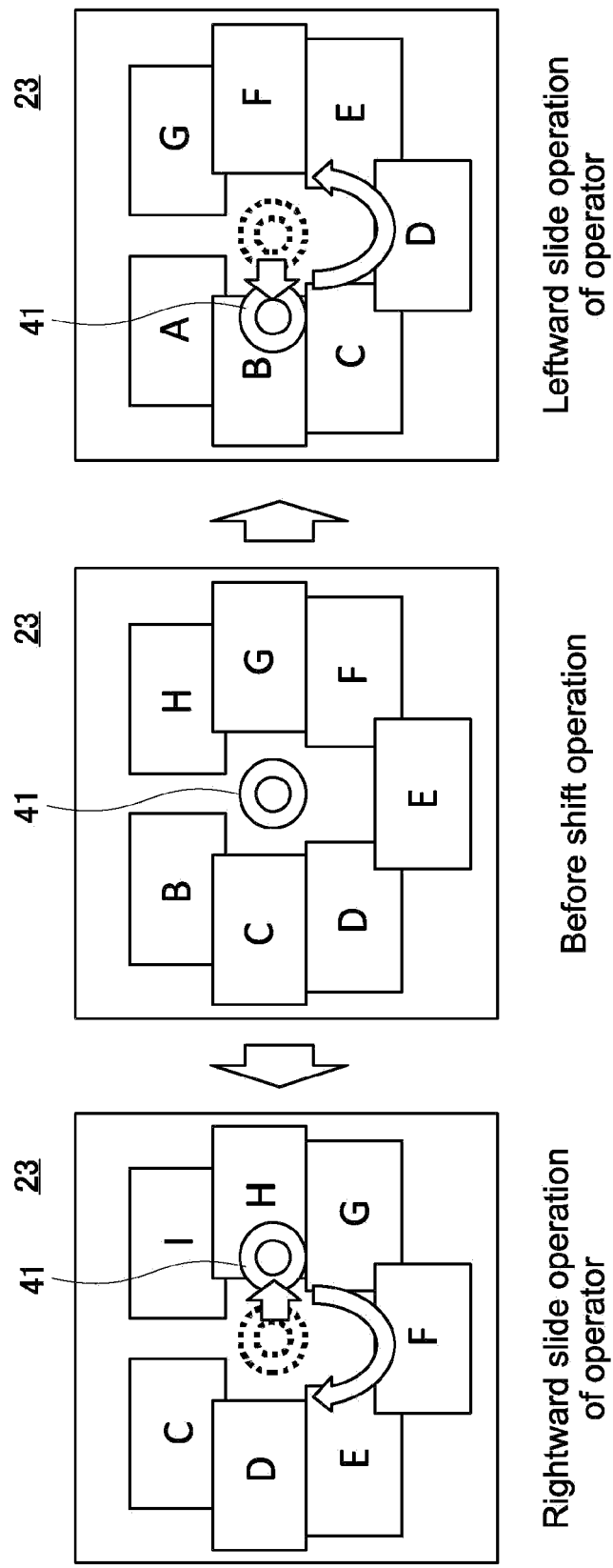
FIG. 7 is a diagram for explaining a shift operation of a thumbnail display range by an operation method 2 in the information processing apparatus shown in FIG. 1.

FIG. 7 is a diagram showing states of the thumbnail display area 23 and the gauge area 25 before (center) and after (left- and right-hand sides) the shift operation of the thumbnail display range by the operation method 2 is made. A to I are each a thumbnail image, and a direction from A to I is a direction of time. In this example, the thumbnail display count is "7".

In the state before the shift operation of the thumbnail display range (center), the thumbnail images B to H are displayed. Here, when an operation input of sliding the operation object 41 provided at the center of the thumbnail images in the right-hand direction is made by the user as shown on the left-hand side of FIG. 7, the CPU 13 judges the operation and shifts the thumbnail display range only by an amount corresponding to the setting frame interval in the clockwise direction. As a result, the state where the thumbnail images B to H are displayed is updated to a state where thumbnail images C to I are displayed. Specifically, the thumbnail image B corresponding to a frame closest to the start point, that has been displayed before the shift operation of the thumbnail display range is made, disappears, the thumbnail images C to H shift one by one in the clockwise direction along the annular arrangement, and the thumbnail image I corresponding to a frame following the thumbnail image H only by an amount corresponding to the setting frame interval newly appears. Furthermore, the CPU 13 shifts the position of the gauge 26 in the gauge area 25 only by a distance corresponding to the shift amount of the thumbnail display range in the right-hand direction.

Conversely, when an operation input of sliding the operation object 41 provided at the center of the thumbnail images in the left-hand direction is made by the user as shown on the right-hand side of FIG. 7, the CPU 13 shifts the thumbnail display range only by an amount corresponding to the setting frame interval in the counterclockwise direction. As a result, the state where the thumbnail images B to H are displayed is updated to a state where the thumbnail images A to G are displayed. Specifically, the thumbnail image H corresponding to a frame closest to the end point, that has been displayed before the shift operation of the thumbnail display range is made, disappears, the thumbnail images B to G shift one by one in the counterclockwise direction along the annular arrangement, and the thumbnail image A corresponding to a frame preceding the thumbnail image B only by an amount corresponding to the setting frame interval newly appears. Furthermore, the CPU 13 shifts the position of the gauge 26 in the gauge area 25 only by a distance corresponding to the shift amount of the thumbnail display range in the left-hand direction.

Then, every time an operation of sliding the operation object 41 in the right- or left-hand direction is judged, the CPU 13 shifts, as well as shift the thumbnail display range by an amount corresponding to the setting frame interval in the clockwise or counterclockwise direction, the position of the gauge 26 in the gauge area 25 in the right- or left-hand direction. Therefore, by repeating the slide operation of the operation object 41 in the same direction a plurality of times, the thumbnail display range is shifted by an amount obtained by multiplying the setting frame interval by the number of times the operation is repeated.

It is also possible to change the shift speed in accordance with the slide amount of the operation object 41 in the right- or left-hand direction. Accordingly, it becomes possible to easily perform a shift operation in a relatively-long distance, with the result that an improvement in operability can be expected. Specifically, while the trace operation along the direction in which the thumbnail images are arranged is excellent in operability when performing a shift operation in a relatively-long distance, an operation amount and the number of operations increase when the shift is made a long distance, which is inefficient. In contrast, if the shift speed is accelerated in proportion to the slide amount of the operation object 41, the shift operation in a relatively-long distance can be performed with ease.

Figure 8:
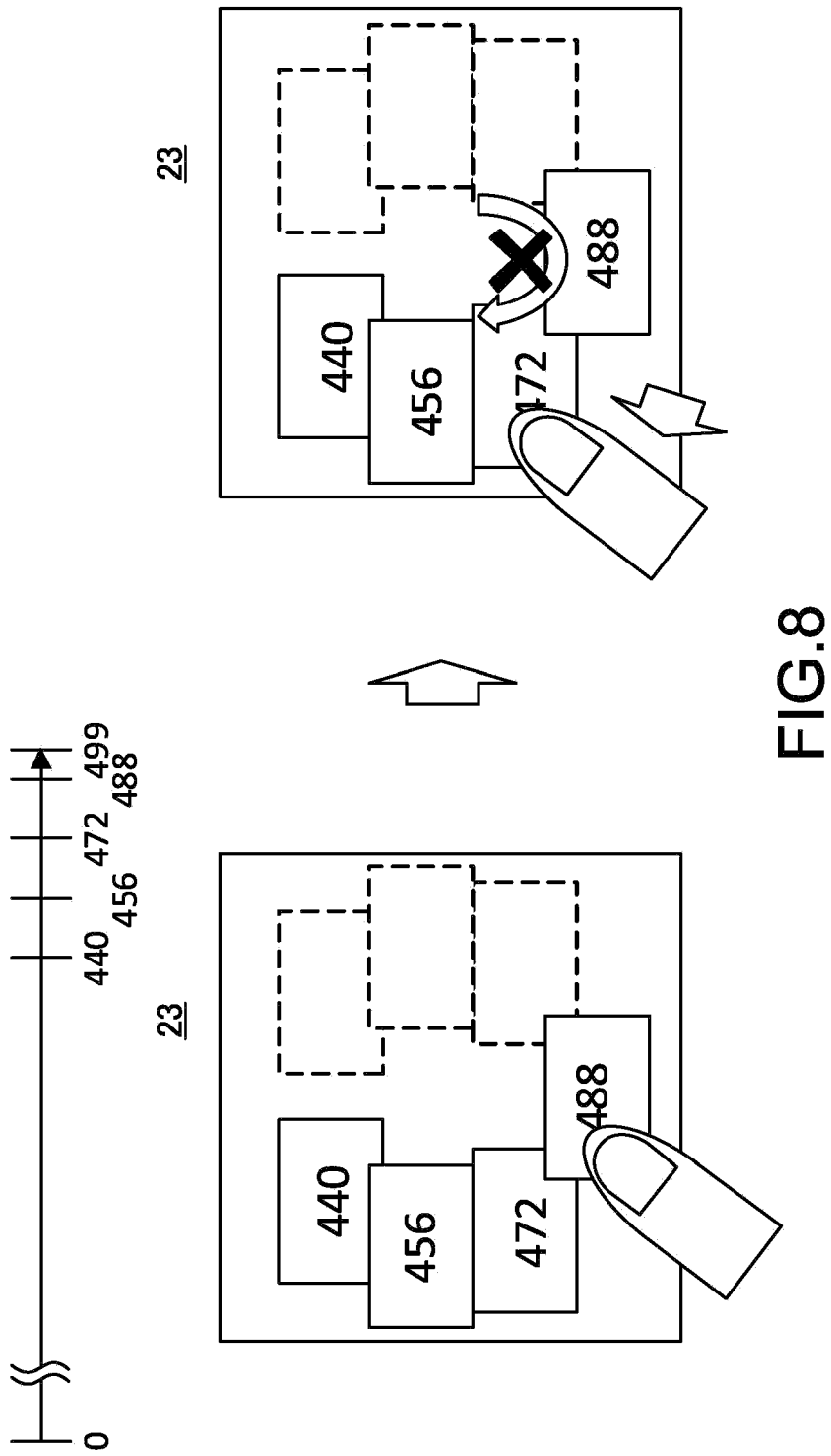
FIG. 8 is a diagram for explaining an operation carried out when an operation input from a user to shift a thumbnail display range in a time forward direction is made at a time the thumbnail display range is at an end point portion of a moving image.

FIG. 8 is a diagram for explaining an operation carried out when an operation input by the operation method 1 or 2 from the user to shift the thumbnail display range in the clockwise direction is made at a time the thumbnail display range is at an end point portion of a moving image.

Here, by shifting the thumbnail images in the clockwise direction by the operation method 1 or 2, only 4 thumbnail images corresponding to 4 frames (frames having frame number=440, 456, 472, and 488 in figure) that belong to the thumbnail display range and are closest to the end point are eventually displayed (see left-hand side of FIG. 8). Even when the user makes an operation of shifting the thumbnail display range in the clockwise direction by the operation method 1 or 2 in this state, the CPU 13 disregards the operation input and does not change the current display state (see right-hand side of FIG. 8).

As described above, after the thumbnail display range is shifted in the clockwise direction until thumbnail images of frames at an end point portion of a moving image are displayed at a plurality of positions close to one side including a position at which a thumbnail image can be regarded as a target to be stored as a still image in the thumbnail display area 23, subsequent operations in the clockwise direction are invalidated. Accordingly, the user can easily grasp during the shift operation of the thumbnail display range that the thumbnail display range has reached the end point portion of the moving image. Moreover, since a situation where the thumbnail display range becomes unclear in the frame selection screen can be prevented from occurring, an improvement in user operability is expected.

The same holds true for a case where an operation input from a user to shift the thumbnail display range in the counterclockwise direction from a state where the thumbnail display range is at a start point portion of a moving image is made. Specifically, by shifting the thumbnail display range in the counterclockwise direction, only 4 thumbnail images corresponding to 4 frames that belong to the thumbnail display range and are closest to the start point are eventually displayed on the frame selection screen.

Even when the user makes an operation of shifting the thumbnail display range in the counterclockwise direction by the operation method 1 or 2 in this state, the CPU 13 disregards the operation input and does not change the current display state.

(Setting Frame Interval Change Operation)

In the information processing apparatus 100 of this embodiment, the setting frame interval as a time interval of frames of thumbnail images to be displayed can be changed by an operation of vertically sliding the operation object 41 displayed at the center of the thumbnail images. When the maximum number of frames to be displayed as thumbnail images is fixed, by widening the setting frame interval for displaying thumbnail images, the thumbnail display range is eventually widened. On the other hand, by narrowing the setting frame interval, the thumbnail display range of frames of thumbnail images in a moving image is narrowed.

Figure 9:
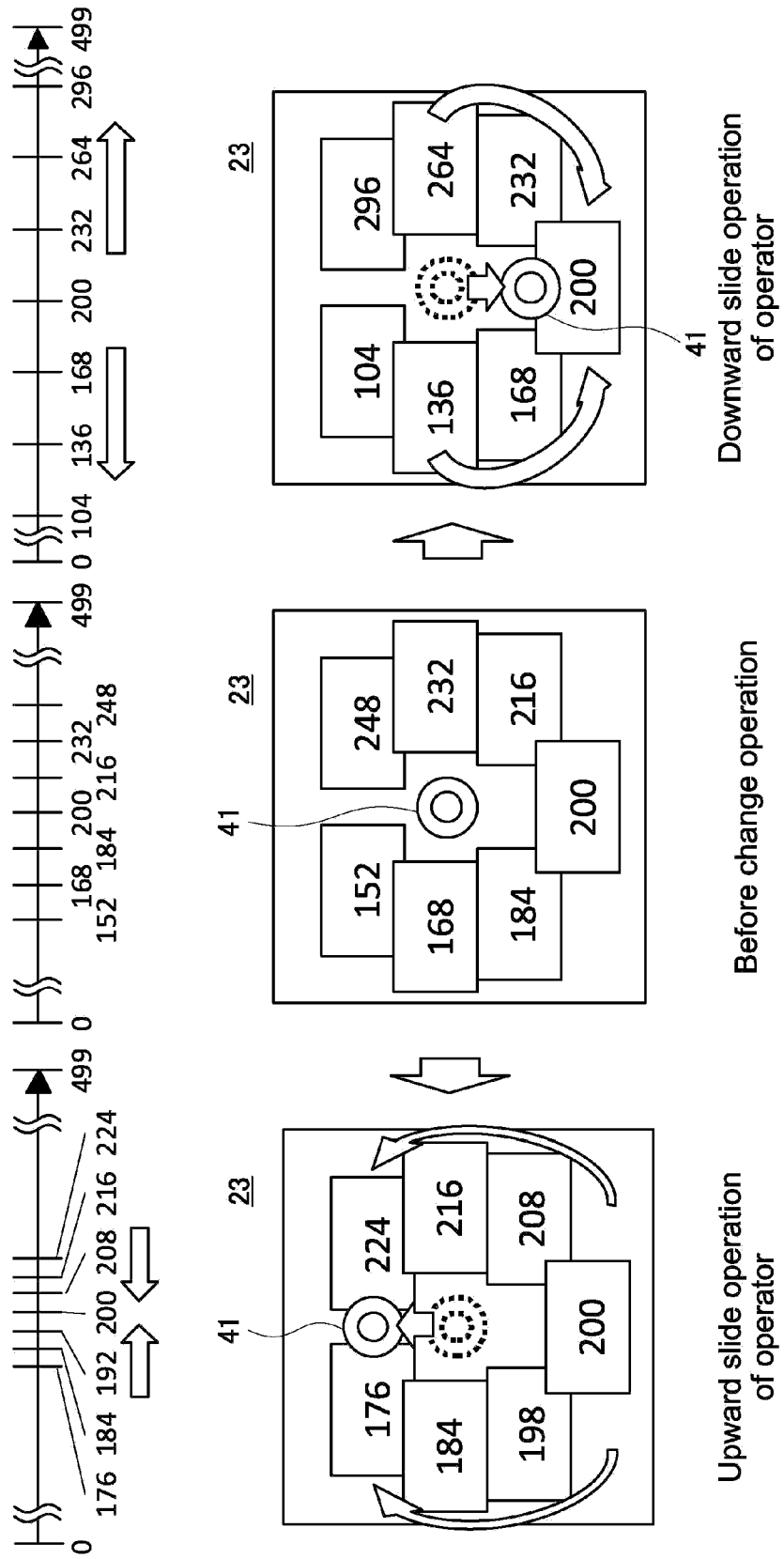
FIG. 9 is a diagram for explaining a setting frame interval change operation in the information processing apparatus shown in FIG. 1.

FIG. 9 is a diagram showing states of the thumbnail display area 23 before (center) and after (left- and right-hand sides) the setting frame interval change operation is made.

In the state before the setting frame interval change operation is made (center), for example, 7 thumbnail images corresponding to a total of 7 frames, that is, 3 frames in front and back of a 200-th frame as an intermediate frame of a moving image constituted of 500 frames, that are provided at a 16-frame interval, are displayed. From this state, assuming that the user has made an operation input of downwardly sliding the operation object 41 provided at the center of the annularly-arranged thumbnail images as shown on the right-hand side of FIG. 9, the CPU 13 judges the operation and widens the setting frame interval like changing the setting frame interval from 16 frames to 32 frames. Specifically, the length of the thumbnail display range is also set to be twice as large. Accordingly, the state is changed to the state where 7 thumbnail images corresponding to a total of 7 frames, that is, 3 frames in front and back of a 200-th frame as an intermediate frame of a moving image constituted of 500 frames, that are provided at a 32-frame interval, are displayed. At the same time, the CPU 13 widens the width of the gauge 26 in the gauge area 25 by an enlargement factor of the setting frame interval while the center position of the gauge 26 is fixed.

In contrast, as shown on the left-hand side of FIG. 9, when the user makes an operation input of upwardly sliding the operation object 41 provided at the center of the annularly-arranged thumbnail images in the state shown at the center of FIG. 9, the CPU 13 narrows the setting frame interval like changing the setting frame interval from 16 frames to 8 frames that is half the number of frames. Specifically, the length of the thumbnail display range is also set to be half the length. Accordingly, the state where 7 thumbnail images corresponding to a total of 7 frames, that is, 3 frames in front and back of a 200-th frame as an intermediate frame of a moving image constituted of 500 frames, that are provided at a 16-frame interval, are displayed is changed to a state where 7 thumbnail images corresponding to a total of 7 frames, that is, 3 frames in front and back of a 200-th frame as an intermediate frame of a moving image constituted of 500 frames, that are provided at n 8-frame interval, are displayed. At the same time, the CPU 13 contracts the width of the gauge 26 in the gauge area 25 by a reduction ratio of the setting frame interval while the center position of the gauge 26 is fixed. By thus enlarging/contracting the width of the gauge 26 in the gauge area 25 by the enlargement factor/reduction ratio of the setting frame interval, the user can visually recognize with ease that the enlargement/contraction have ended, with the result that an improvement in operability can be expected.

The CPU 13 changes the setting frame interval to be 2-, 4-, 8-, 16-, . . . -times the initial setting frame interval every time the operation of downwardly sliding the operation object 41 is made. The CPU 13 also changes the setting frame interval to be ½, ¼, ⅛ 1/16, . . . the initial setting frame interval every time the operation of upwardly sliding the operation object 41 is made.

It should be noted that the method of changing the setting frame interval is not limited to the exponential increase method. For example, the previous setting frame interval may be enlarged/contracted by a predetermined magnification factor every time the operation of upwardly or downwardly sliding the operation object 41 is made.

Moreover, the magnification factor by which the setting frame interval is changed may be controlled based on a time during which the operation object 41 is kept at an upwardly- or downwardly-slid position or a slide amount. More specifically, in the state where the operation object 41 is kept at an upwardly- or downwardly-slid position, there are a method of performing control such that the setting frame interval is continued to be enlarged or contracted, a method of performing control such that the setting frame interval is changed by a magnification factor that is based on a slide amount, and the like.

(Processing Procedures of Control Based on Operations Above)

Figure 10:
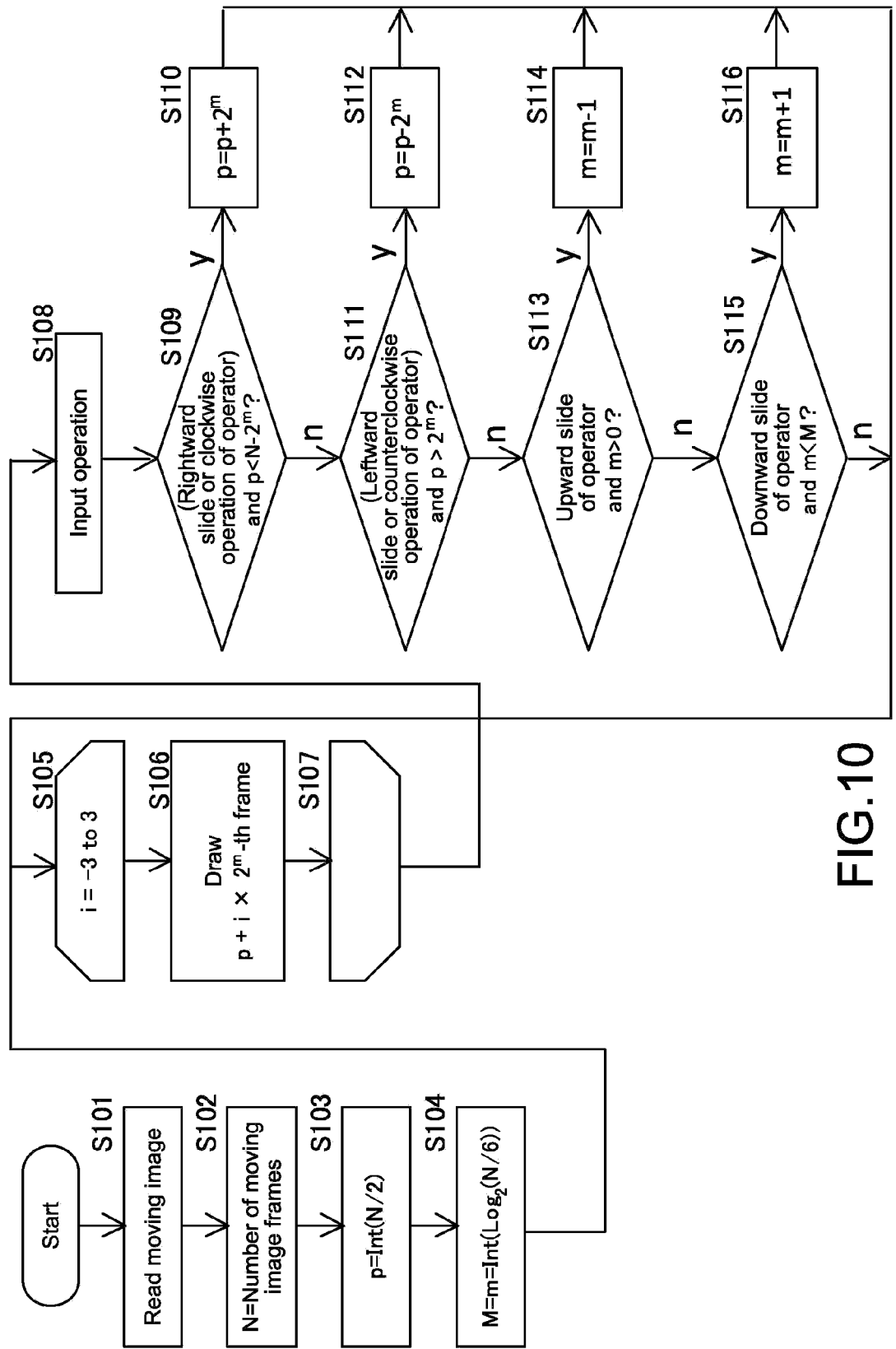
FIG. 10 is a flowchart showing control procedures corresponding to the operations above.

FIG. 10 is a flowchart showing procedures of control based on the operations above.

The flowchart shows operational procedures that the CPU 13 executes based on a program.

Here, the thumbnail display count is "7", the setting frame interval is "2", and the frame number displayed at the center position is "p".

The CPU 13 first reads moving image data (Step S101) and sets a moving image frame count to N (Step S102).

Next, the CPU 13 calculates a frame number Cp at an intermediate point of the entire moving image by the following equation.

$$Cp = Int(N/2) \quad (1)$$

Then, the CPU 13 sets the calculated frame number Cp at the intermediate point of the entire moving image as the frame number p of the thumbnail image at the center position of the thumbnail display range (Step S103).

Subsequently, the CPU 13 calculates m and sets a maximum value out of values of m to M (Step S104).

$$M = m = Int(\mathrm{Log}_2(N/6)) \quad (2)$$

Specifically, M is a maximum integer with which, when the entire moving image is divided into 6 sections by $2^M$, a total frame count of each divisional section does not exceed the number of all frames in the moving image. Accordingly, an initial value of the setting frame interval is determined.

After that, the CPU 13 selects, based on the frame number p and the setting frame interval "$2^{m'}$" set as the initial values, a frame of the frame number p and 3 frames each from front and back of the frame of the frame number p at a "$2^{m'}$" interval, and generates thumbnail images corresponding to the total of 7 frames to display them (Steps S105 to S107).

After that, the CPU 13 receives an input of the shift operation of the thumbnail display range an input of the setting frame interval change operation (Step S108).

The CPU 13 carries out the shift operation of the thumbnail display range and the setting frame interval change operation according to the received operation inputs from the user with respect to the thumbnail display area 23. Specifically, 1. When judging an input of a slide operation of the operation object 41 in the right-hand direction or an operation of tracing it in the clockwise direction and when $p<N-2^m$ is satisfied (y in Step S109), the CPU 13 shifts the thumbnail display range in the clockwise direction by an amount corresponding to the setting frame interval (Step S110).

It should be noted that the state where $p<N-2^m$ is satisfied is a state where it is possible to shift the thumbnail display range in the clockwise direction at an end point portion of a moving image.

2. When judging an input of a slide operation of the operation object 41 in the left-hand direction or an operation of tracing it in the counterclockwise direction and when $p>2^m$ is satisfied (y in Step S111), the CPU 13 shifts the thumbnail display range in the counterclockwise direction by an amount corresponding to the setting frame interval (Step S112).

It should be noted that the state where $p>2^m$ is satisfied is a state where it is possible to shift the thumbnail display range in the counterclockwise direction at a start point portion of a moving image.

3. When judging an upward slide operation of the operation object 41 and when m>0 is satisfied (y in Step S113), the CPU 13 decrements m by 1 and contracts the setting frame interval (Step S114). When an upward slide operation of the operation object 41 is detected but m>0 is not satisfied, m is not decremented.

4. When judging a downward slide operation of the operation object 41 and when m<M is satisfied (y in Step S115), the CPU 13 increments m by 1 and enlarges the setting frame interval (Step S116). When a downward slide operation of the operation object 41 is detected but m<M is not satisfied, m is not incremented.

After any of the changes of 1. to 4. is carried out, the CPU 13 re-generates the thumbnail images corresponding to the 7 frames displayed in the thumbnail display area 23 and displays them (Steps S105 to S107).

It should be noted that although initial values set so as to look down on the entire moving image by setting a frame at an intermediate position of the entire moving image to be a frame at a center position (position at which thumbnail image as a target to be stored as a still image is displayed) of the thumbnail display range have been adopted in the operations above, the initial values are not limited thereto. In other words, any frame at any position of a moving image may be used as a frame displayed at a center position of the thumbnail display range. Moreover, other appropriate values may be used for the initial value of the setting frame interval.

Further, although the processing has been carried out based on the frame number in shifting the thumbnail display range and changing the length of the thumbnail display range, the processing may be carried out based on time using a time stamp attached to the frames as attribute information.

Furthermore, in re-generating and displaying thumbnail images corresponding to 7 frames to be displayed in the thumbnail display area 23 after changing the setting frame interval, animation display may be performed so that the user can intuitively grasp the changed content of the setting frame interval.

As described above, a function of receiving an instruction to shift the thumbnail display range and a function of receiving an instruction to change the setting frame interval are allocated to the operation object 41. Therefore, an improvement in efficiency due to sharing of an operation target is expected in a case where the operation of shifting the thumbnail display range and the operation of changing the setting frame interval are carried out alternately. In addition, since the operation object 41 is provided at the center of the plurality of annularly-arranged thumbnail images, the user can operate the operation object 41 while looking at the thumbnail images and the operation object at the same time, with the result that an improvement in operability can be expected.

(High-Speed Thumbnail Image Display 1)

In the information processing apparatus 100 of this embodiment, moving image data encoded by an inter-frame prediction of, for example, MPEG (Moving Picture Experts Group)-2, MPEG-4, H.263, and H.264 is handled. At least a part of the frames displayed as thumbnail images is changed along with the shift of the thumbnail display range and change of the setting frame interval. At this time, in a case where decoding of frames to be displayed as thumbnail images (hereinafter, referred to as display target frames) is a type of frame that depends on a decoding result of other adjacent frames (hereinafter, referred to as "display target adjacent frames"), such as P (Predictive Picture) picture and B (Bidirectionally Predictive Picture) picture, decoding is eventually carried out a plurality of times before thumbnail images of the display target frames are displayed, thus requiring time. As a result, there is a fear that the user may feel uncomfortable.

In this regard, in the information processing apparatus 100, thumbnail images as decoding results of display target adjacent frames are displayed until decoding results of display target frames are obtained since obtaining the decoding results of the display target adjacent frames. As a result, a standby time before thumbnail images are first displayed in the thumbnail display area 23 is shortened, and a possibility that the user may be stressed by the long wait time before the thumbnail images are displayed is lowered. Since thumbnail images of frames that are supposed to be displayed are displayed after that, a change in the display of the thumbnail images occur, but since the change is merely a change between adjacent frames, the uncomfortableness of the user can be kept low.

Figure 11:
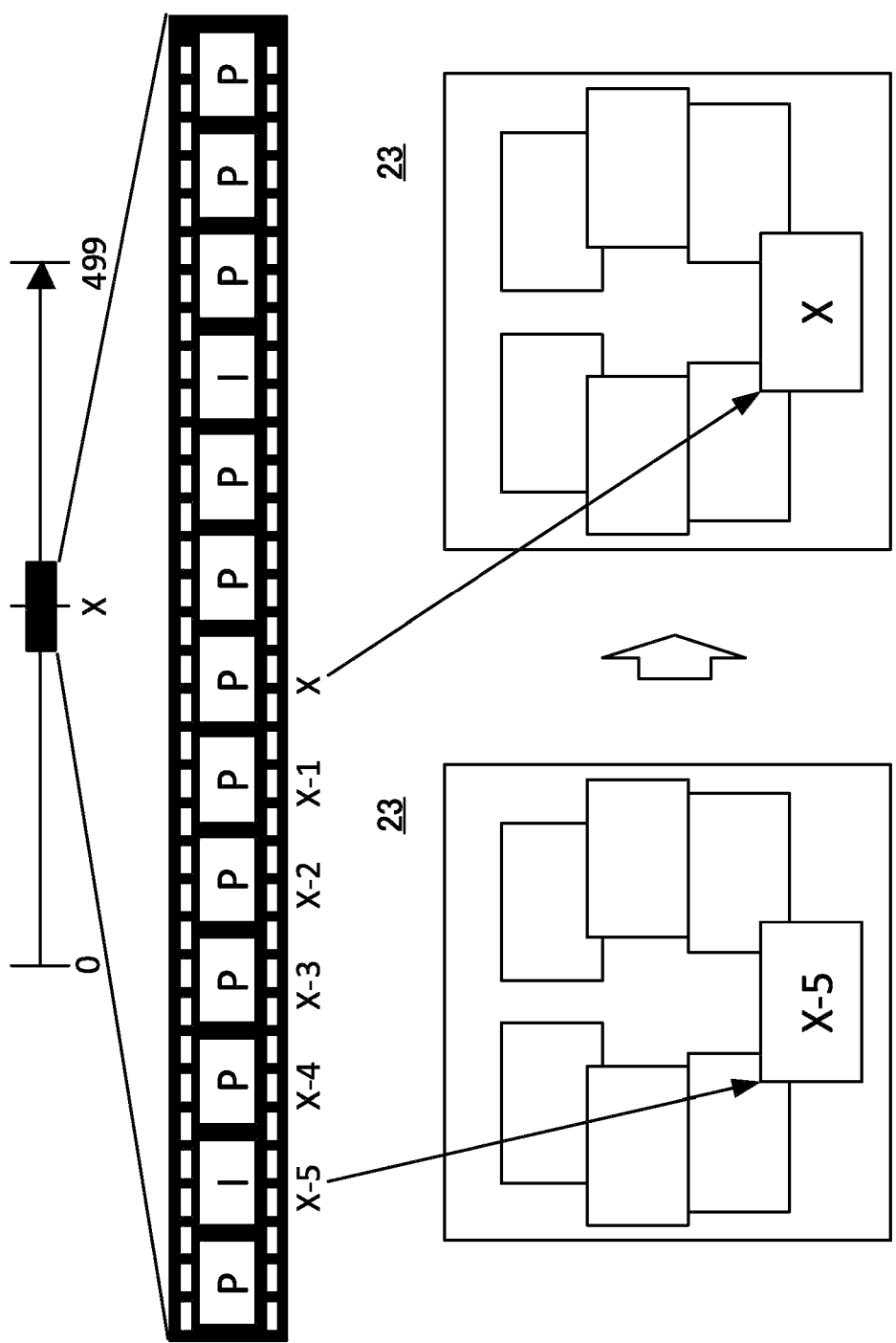
FIG. 11 is a diagram for explaining specific examples of a speed increase 1 in thumbnail image display in the information processing apparatus shown in FIG. 1.

FIG. 11 is a diagram for explaining specific examples of high-speed thumbnail image display 1.

For brevity, moving image data is constituted of an I (Intra Picture) picture and a P picture. Here, the P picture of X is a display target frame. In this case, the CPU 13 first displays an I picture of X-5 necessary for decoding the P picture of X as a display target adjacent frame and a result of decoding the I picture of X-5 as a thumbnail image (see left-hand side of FIG. 11). On the other hand, the CPU 13 decodes the P picture of X as a display target frame using the thumbnail image as the decoding result of the I picture of X-5, and upon obtaining the decoding result, updates the display of the thumbnail image by rewriting, in the display memory, the thumbnail image as the decoding result of the I picture by the thumbnail image as the decoding result (see right-hand side of FIG. 11).

The same holds true for an operation carried out when the display target frame is a B picture. In this case, the CPU 13 decodes the I picture that is referenced for decoding the B picture and displays the decoding result as a thumbnail image.

After that, the CPU 13 decodes the B picture using the decoding result of the I picture or the thumbnail image of the P picture decoded using the decoding result of the I picture, and rewrites, in the display memory, the thumbnail image as the decoding result of the I picture or the P picture by the thumbnail image as the decoding result.

(High-Speed Thumbnail Image Display 2)

By storing data of thumbnail images as decoding results of frames in a cache memory as cache data, by reading and displaying data of a relevant thumbnail image from the cache memory in displaying a thumbnail image of the same frame after that, decoding time becomes unnecessary, and the standby time for display of thumbnail images can be significantly shortened. It should be noted that the cache memory is an area provided in, for example, the work memory shown in FIG. 1.

Figure 12:
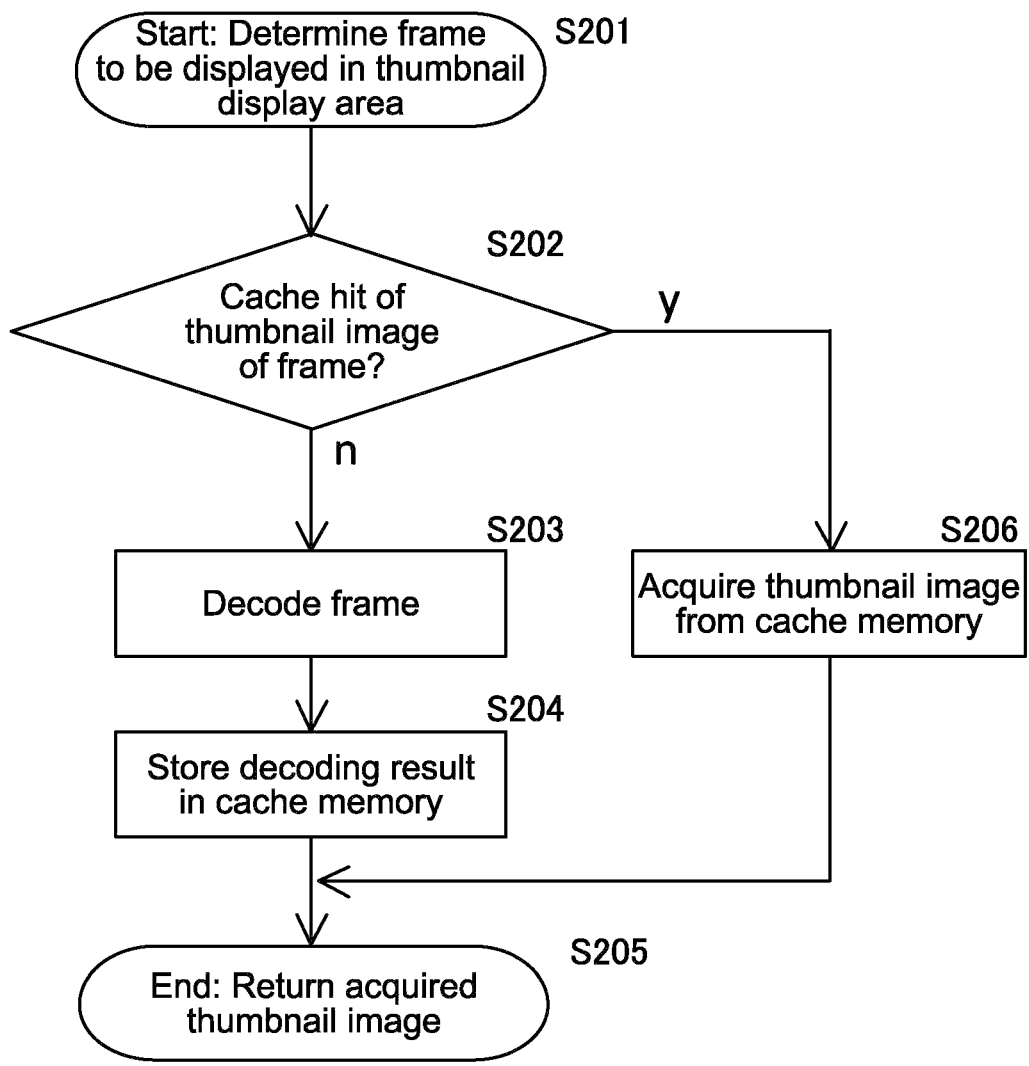
FIG. 12 is a diagram for explaining specific examples of a speed increase 2 in thumbnail image display in the information processing apparatus shown in FIG. 1.

FIG. 12 is a flowchart related to a cache of thumbnail image data and a use of the cache. The flowchart shows a subroutine of the processing for obtaining thumbnail images corresponding to frames.

When a frame for which a thumbnail image is to be displayed in the thumbnail display area 23 is determined (Step S201), the CPU 13 activates the subroutine shown in FIG. 12. According to the subroutine, the CPU 13 first checks whether thumbnail image data of the relevant frame is stored in the cache memory (Step S202). When the thumbnail image data of the relevant frame is not stored in the cache memory (n in Step S202), the CPU 13 decodes the frame to obtain thumbnail image data (Step S203) and stores the thumbnail image data as cache data corresponding to the frame (Step S204). The CPU 13 also returns the thumbnail image data as a decoding result of the frame to a main routine as a thumbnail image to be displayed in the thumbnail display area 23 (Step S205).

On the other hand, when thumbnail image data of the relevant frame is stored in the cache memory (cache hit) (y in Step S202), the CPU 13 obtains thumbnail image data of the relevant frame from the cache memory (Step S206) and returns it to the main routine as a thumbnail image to be displayed in the thumbnail display area 23 (Step S205).

It should be noted that in the embodiment above, the decoded thumbnail image data is stored in the cache memory without being limited in number. In contrast, when a capacity that can be used for the cache memory is limited in the memory, for example, the capacity that can be used for the cache memory may be limited without lowering performance as a cache by, for example, deleting cache data having a low use frequency using an LRU (Least Recently Used) algorithm or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a display unit including a screen;
a detection unit configured to detect a position designated by a user on the screen; and
a controller configured to display, with at least a partial range of a moving image being a display range, a plurality of images corresponding to a plurality of frames belonging to the display range by annularly arranging them in time series, and shift, when an operation is judged to be made along a direction in which the plurality of images are arranged based on a result of the detection by the detection unit, the display range in the moving image,
wherein the plurality of images annularly arranged and displayed on the screen are a plurality of images each corresponding to a frame set for each of set intervals,
wherein the controller displays an operation object for receiving an operation input from the user at substantially the center of the annularly-arranged images, and sets, when an operation is judged to be made to the operation object based on a result of the detection by the detection unit, a setting value of the intervals,
wherein the controller discriminates an operation content with respect to the operation object at least between a first operation content and a second operation content, sets the setting value of the intervals when judged as the first operation content, and shifts the display range when judged as the second operation content, and
wherein the first operation content is an operation for moving the operation object in a first axial direction on the screen, and the second operation content is an operation for moving the operation object in a second axial direction orthogonal to the first axial direction.

2. The information processing apparatus according to claim 1,
wherein the controller displays a gauge area including a gauge that indicates a position and occupant ratio of the display range in the moving image, and a displacement direction of the gauge coincides with the second axial direction in the gauge area.

* * * * *